(12) United States Patent
Nakamura et al.

(10) Patent No.: US 7,704,373 B2
(45) Date of Patent: Apr. 27, 2010

(54) WASTE FLUID OR WASTE WATER TREATMENT METHOD AND ITS APPARATUS

(75) Inventors: Shinichi Nakamura, Osaka (JP); Kunihiko Fukuzuka, Habikino (JP)

(73) Assignee: Omega Co., Ltd. (JP)

( * ) Notice: Subject to any disclaimer, the term of this patent is extended or adjusted under 35 U.S.C. 154(b) by 813 days.

(21) Appl. No.: 10/243,418

(22) Filed: Sep. 13, 2002

(65) Prior Publication Data

US 2003/0098247 A1 May 29, 2003

(30) Foreign Application Priority Data

Oct. 22, 2001 (JP) .............................. 2001-323356

(51) Int. Cl.
*C02F 1/461* (2006.01)

(52) U.S. Cl. ..................... 205/742; 205/751; 204/275.1; 204/276

(58) Field of Classification Search ................. 205/701, 205/742, 751; 204/275.1, 276
See application file for complete search history.

(56) References Cited

U.S. PATENT DOCUMENTS

| | | | | |
|---|---|---|---|---|
| 3,616,355 | A * | 10/1971 | Themy et al. ................ | 205/701 |
| 5,972,196 | A * | 10/1999 | Murphy et al. .............. | 205/466 |
| 6,106,691 | A * | 8/2000 | Nakamura et al. .......... | 205/701 |
| 6,235,186 | B1 * | 5/2001 | Tanaka et al. ............... | 205/521 |
| 6,966,995 | B1 * | 11/2005 | Tanimoto .................... | 210/748 |

FOREIGN PATENT DOCUMENTS

| | | |
|---|---|---|
| JP | 08-192162 | 7/1996 |
| JP | 10-043745 | 2/1998 |
| JP | 10-085753 | 4/1998 |
| JP | 11-128942 | 5/1999 |
| JP | 11-256398 | 9/1999 |
| JP | 2000-079395 | 3/2000 |
| JP | 2000-301153 | 10/2000 |
| JP | 2001-340881 | 12/2001 |
| JP | 2001-347270 | 12/2001 |
| JP | 2002-143642 | 5/2002 |

* cited by examiner

*Primary Examiner*—Arun S Phasge
(74) *Attorney, Agent, or Firm*—Hayes Soloway P.C.

(57) ABSTRACT

A method for electrochemical oxidation decomposition of difficult to decompose compounds such as aromatic compounds, organic chlorine compounds, agricultural chemicals, dioxin, PCB's and water soluble polymers that are contained in waste fluid, such as print developing waste fluids, factory waste water and industrial waste water, and landfill soil seeping waste water by carrying out electrolysis at a high current density to eliminate and purify difficult to decompose substances in the waste fluid. Waste fluid containing difficult to decompose substances is introduced into an electrolytic chamber having a ferrite electrode anode, electrolysis is performed at a high current density of 10 A/dm$^2$ or higher, hypohalogenous acid and active oxygen are generated in the waste fluid along with a strong anode oxidation action being brought about, and the oxidation decomposition is repeated by re-circulating the waste fluid through a filter, electrolyzer and an intermediate collecting chamber.

12 Claims, 4 Drawing Sheets

WASTE FLUID OR WASTE WATER TREATMENT METHOD AND ITS APPARATUS

BACKGROUND OF THE INVENTION

This invention relates to electrochemical oxidation decomposition of difficult to decompose substances such as aromatic compounds (benzene, chlorobenzene, chlorophenol) that are contained in things such as waste fluid of things such as developing waste fluids, incinerator exhaust gas treatment water, industrial waste water, landfill soil seeped waste water, organic compounds (such as trichloroethylene, tetrachloroethylene, tetrachloroethane), agricultural chemicals (such as DDT, PCP, parathion, TPN.tetrachloroisophthalonitril, triforin, MEP.sumithion, diazinon), dioxin, PCB's, water soluble polymers such as poly(vinyl alcohol), polyacrylonitrile, polyether) and nitrate ions.

BRIEF DESCRIPTION OF THE PRIOR ART

Treatment of waste fluid or waste water that contains difficult to decompose substances such as the aforementioned aromatic compounds (benzene, chlorobenzene types, chlorophenol), organic chlorine compounds (such as trichloroethylene, tetrachloroethylene, tetrachloroethane), agricultural chemicals (such as DDT, PCP, parathion, TPN tetrachloroisophthalonitril, triforin, MEP sumithion, diazinon), dioxin, PCB's, water soluble polymers (such as poly(vinyl alcohol), polyacrylonitrile, polyether) and nitrate ions is difficult. Conventional bio-treatment methods or absorption methods are not effective for the above-mentioned difficult to decompose compounds.

The present inventors filed patents as follows pertaining to waste fluid or waste water purification and sterilization methods and their apparatus.

(1) Japanese Patent Application H7-004319
"Waste Fluid Treatment Equipment"

According to this prior patent application, a circulating current path is established between an intermediate collection chamber that collects waste fluid and an electrolytic chamber, electrolysis is carried out within an electrolytic chamber wherein active oxygen is generated within the circulating waste fluid, and the oxidation decomposition action of the active oxygen that is generated is brought in contact with the waste fluid. A sodium halide or a potassium halide is utilized for generating active oxygen.

A decrease of chemical oxygen demand (COD) 10520 of waste printing plate developing solution to COD 300 is achieved with an electrode surface area of 40 $dm^2$, a voltage of 7 V, a current of 100 A and a current density of 2.5 $A/dm^2$. However, problems remain such as the suppression of the generation of chlorine gas and the need for further improving the treatment efficiency. In particular, a high current density is necessary for a high oxidation electrolysis efficiency of difficult to decompose compounds by anode oxidation. However, increasing current density to greater than 2.5 $A/dm^2$ results in corrosion of the titanium platinum plated (1.5μ) anode. Further, repeated electrolysis must be carried out under conditions of high residual chlorine concentrations for 3 to 6 hours in an acidic range of decreasing COD. But, there were the problems that chlorine gas was frequently generated and trihalomethanes were generated as byproducts.

(2) Japanese Patent Application H9-299084
"Water Purification Method and Its Equipment"

This prior patent application describes purifying and sterilizing water such as bath water and pool water through electrolysis by an electrolyzer that is established in a circulating current path while holding to a fixed conductivity by supplying electrolytes for water with a low electrical conductivity such as bath water or pool water. According to this application purification and sterilization is possible by electrolysis of water having low electrical conductivity by using ferrite electrodes as the anodes. However, there is still the problem of ferrite electrode damage due to the terminal section being heated when the electrical current value increases.

Filtering with filters is also often carried out for the purification of used water and waste water. There is the problem of refreshing filters because of filter clogging.

(3) Japanese Patent Application H8-203814
"Filter Washing and Refreshing Equipment"

This prior patent application describes a method for washing and refreshing filters using an electrolyzer.

Effective electrolysis is possible when a filter is not established on the side toward the electrolyzer due to the elimination of suspended matter in the water to be treated when using an electrolyzer for the purification and sterilization of used water or waste water. A decrease of the treated amount when the filter becomes clogged is a problem.

(4) Japanese Patent Application 2000-168578
"Electrolyzer"

This prior patent application describes an electrolysis method that is characterized by using a low melting point metal or mercury with good conductivity for forming the junction of the terminal main body with a nickel ferrite electrode as the anode. An electrolyzer that can purify and sterilize even water with low conductivity such as low conductivity bio-use, waste water, bath water and pool water is possible according to this prior patent application, but oxidation decomposition treatment of difficult to decompose substances that are contained in waste fluid or waste water is not possible.

SUMMARY OF THE INVENTION

The carrying out of electrolysis with high current density is desirable for electrochemical oxidation decomposition of difficult to decompose substances in waste fluid and waste water. The electrodes that are generally used in the past have the problem of the anodes corroding in a short time period under highly acidic conditions due to being exposed to strong acids.

This invention has the object of providing an electrochemical oxidation decomposition method and apparatus for difficult to decompose compounds such as aromatic compounds (benzene, chlorobenzene, chlorophenol), organic chlorine compounds (such as trichloroethylene, tetrachloroethylene, tetrachloroethane), agricultural chemicals (such as DDT, PCP, parathion, TPN tetrachloroisophthalonitril, triforin, MEP sumithion, diazinon), dioxin, PCB's, water soluble polymers (such as poly(vinyl alcohol), polyacrylonitrile, polyether) and nitrate ions that are contained in things such as waste fluid of developing waste fluids, factory waste water and industrial waste water, and landfill soil seeped waste water with electrolysis performed at high current density using a simple process at low cost with a ferrite electrode as the anode.

In accordance with the present invention, waste fluid or waste water that contains difficult to decompose substances is introduced in an electrolyzer 1 with an anode 11 that is a ferrite electrode and a powerful oxidation decomposition action is imparted by generating hypohalogenous acid and active oxygen for waste fluid or waste water through electrolysis with a current density of 10 $A/dm^2$ or higher.

Electrode oxidation by electrolysis which is carried out at a high current density has oxidation decomposition action due to the hypohalogenous acid and active oxygen that are generated by that with this powerful oxidation decomposition.

This is made powerful as active oxygen such as a hydroxyl radical (OH.) is generated at the anode, but the life of active oxygen such as this hydroxyl radical (OH.) is short. The life is much longer than that of active oxygen such as a hydroxyl radical (OH.) when hypohalogenous acid that is generated in the electrolytic treatment solution is in contact with materials such as organic substances. The hypohalogenous acid in the electrolytic treatment solution temporarily decomposes from contact with things such as organic substances and oxidation decomposition of difficult to decompose compounds is possible by the generation of active oxygen of things such as a hydroxyl radical (OH.).

When there is electrolysis at a high current density, a nickel ferrite electrode may be damaged by heat generated in the metal terminal section. The present invention solves the problem of terminal heat generation by using a low temperature melting point metal with a melting point of 150° C. or less, preferably of 100° C. or less, or mercury which has good electrical conductivity, for a low melting point metal junction or mercury filled section 14 of nickel ferrite electrode 11 and anode terminal main body 15. The terminal main body of the solid rod terminal is inserted to make internal contact to a long cylindrical electrode length-wise, and a broad electrical contact surface is maintained due to being filled with a melted low melting point metal or mercury.

Electrolysis at a high current density of 10~1000 A/dm$^2$ becomes possible by the means discussed in the proceeding paragraph. The present invention can be applied to waste fluid or waste water that includes a wide range of difficult to decompose substances, but being carried out at a current density of 20~300 A/dm$^2$ is desirable as economical for current demands.

The electrode surface area easily can be increased by easily increasing the number of individual units by connecting a number of cylindrical nickel ferrite electrodes 11 in a number of units length-wise separated by means of a separator 14 that is water resistant and corrosion resistant.

When the electrical conductivity of the waste fluid or waste water is low, strong anode oxidation action can be carried out by the flow of the current at a high current density of 10 A/dm$^2$ or higher by adding sodium halide or potassium halide (bromine or chlorine as the halogen).

Waste fluid or waste water is introduced into an electrolytic path (reaction section) 13, electrolytic treatment is repeatedly carried out, and elimination is by successive oxidation decomposition from substances that are comparatively easily decomposed, then the substances that are easily oxidized by electrode oxidation or active oxygen of the generated hypohalogenous acid are reacted and the difficult to decompose substances remain unreacted, but oxidation decomposition can be carried out with good efficiency on difficult to decompose substances by repeating electrolytic treatment through circulation.

Carrying out electrolysis of waste fluid or waste water in an electrolytic path 13 of an electrolyzer 1 only one time is inadequate for carrying out effective electrolysis for waste fluid or waste water that contains difficult to decompose compounds. The construction is such that a circulating current path 51 is established between an intermediate collection chamber 4 that collects waste fluid or waste water and the electrolyzer 1, electrolysis is carried out in the electrolytic path 13 of the electrolyzer 1 such as generating hypohalogenous acid and active oxygen in the circulating waste fluid or waste water, and bringing about oxidation decomposition action of the generated hypohalogenous acid and active oxygen for the waste fluid or waste water that is collected in the intermediate collection chamber 4. The aforementioned waste fluid or waste water collection chamber successively sends the waste fluid and waste water that has arrived from the electrolyzer 1 back to the electrolyzer. The purified part is discharged from the treated water outlet 33 through the treated water strainer 32, this is repeated for waste fluid or waste water since the construction is such that the same amount as that is introduced through the strainer 31 from the waste fluid or waste water tank 6 and continues along with receiving the anode oxidation action in this electrolytic path 13 and oxidation decomposition treatment is possible for waste fluid or waste water.

Along with removing filtered substances in waste fluid or waste water by the placement of a filter 3 in the circulating current path 51 on the side toward the electrolyzer 1, the oxidation decomposition action of hypohalogenous acid and active oxygen that are generated in the circulating water is imparted to the difficult to decompose substances in the filtered substances that are accumulated in the filter 3, and the oxidation decomposition action is imparted to the difficult to decompose substances along with the organic substances in the accumulated filtered substances.

Effective decomposition treatment is possible by selective combinations of things such as current density, electrical conductivity, electrode surface area, treatment flow rate, and independent or mixed (mixing molar ratio range from 6:4 to 1:9) halogen ions, bromine ions and chlorine ions corresponding to any difficult to decompose compounds that are contained in waste fluid or waste water such as developing waste fluids (such as color developing fixing solution, printing making developing stabilizing solution), aromatic compounds, organic chlorine compounds, agricultural chemicals, dioxin, PCB's, and water soluble polymers.

DETAILED DESCRIPTION OF PREFERRED EMBODIMENTS

Actual embodiments of this invention are explained by referring to the figures that originate in the actual examples, but this invention is not limited to these.

Figure 1:
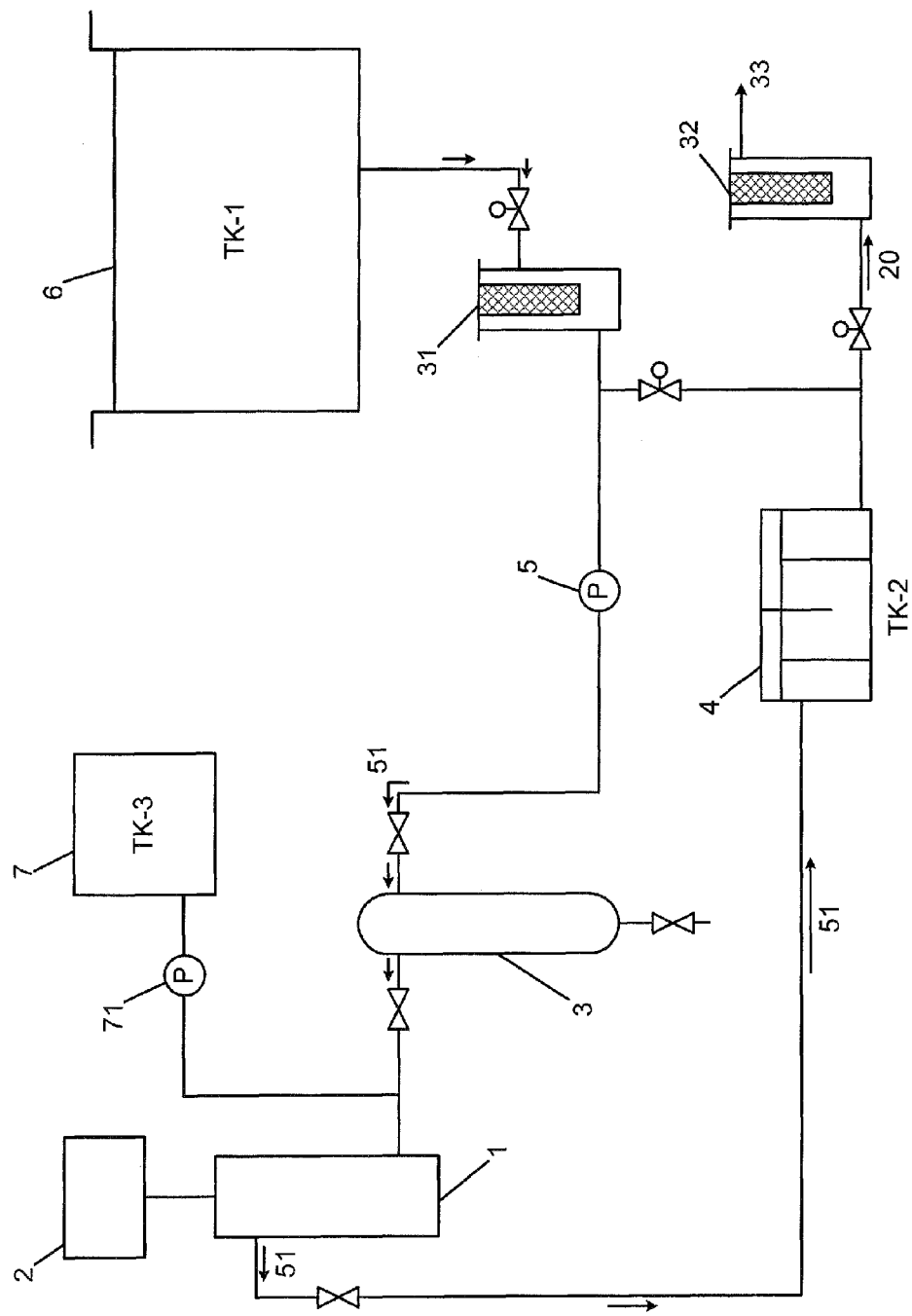
FIG. 1 is a system flow diagram that shows the conditions when there is circulation and repeated oxidation decomposition action of waste fluid or waste water that contains difficult to decompose substances by establishing a circulating current path 51 between intermediate collection chamber 4, filter 3 and electrolyzer 1.

In the system flow diagram of FIG. 1, electrolytic treatment is performed in an electrolyzer by circulating waste fluid or waste water through a circulating pump 5 causing waste fluid or waste water that contains difficult to decompose compounds to flow through a crude water strainer 31 from waste fluid or waste water tank 6. The oxidation decomposition action of hypohalogenous acid and active oxygen is executed during collection of electrolytic treated water in intermediate collection chamber 4. Then, this flows through circulating current path 51 and circulating pump 5 and circulates to the electrolyzer 1, and the process is repeated until adequate oxidation decomposition is performed and there is purification. When necessary, a filter 3 that removes the filtered substances in the waste fluid or wastewater is provided in the circulating current path 51.

Figure 2:
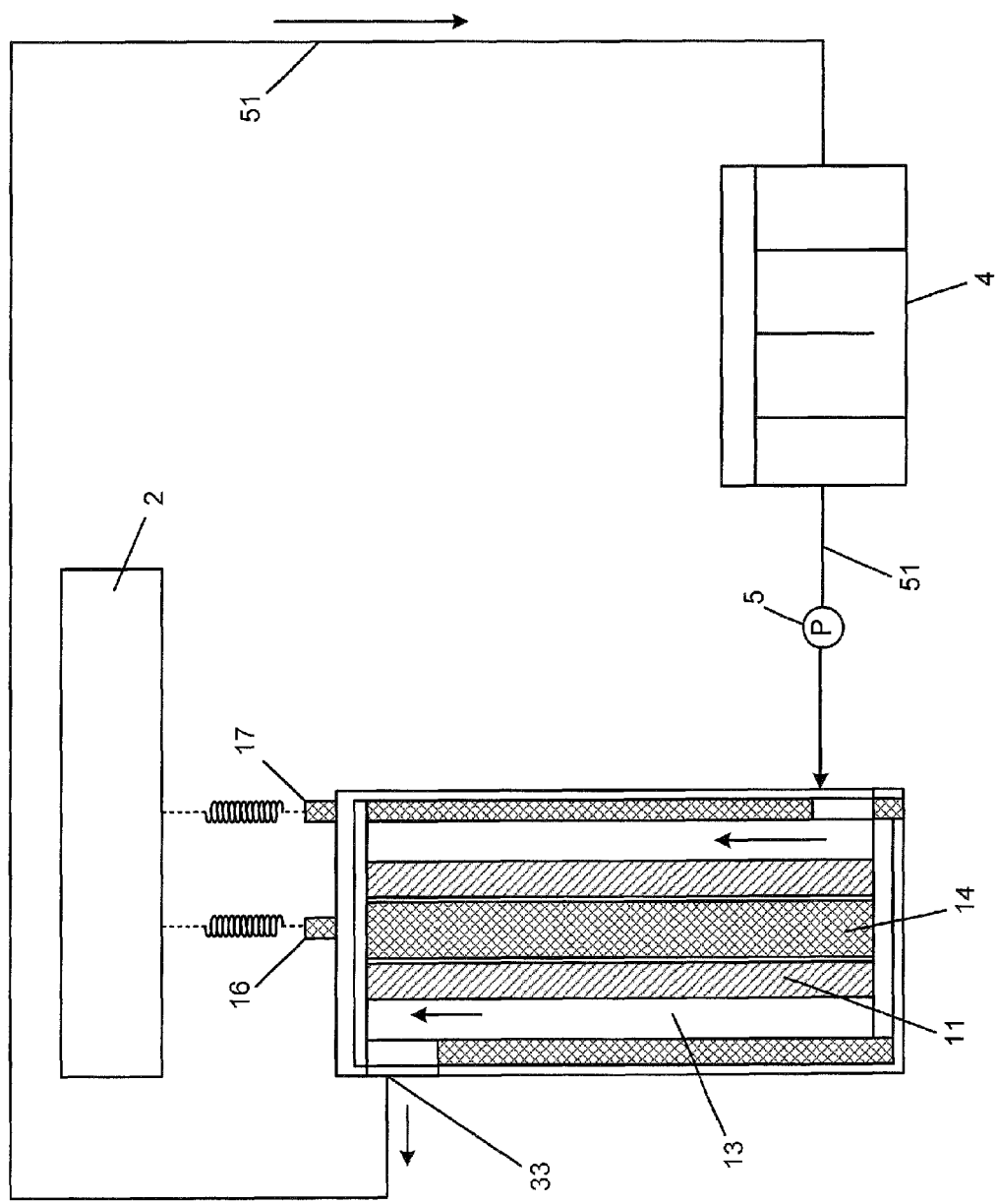
FIG. 2 is a system flow diagram of an electrolytic treatment apparatus.

An apparatus that is shown by the system flow diagram of FIG. 2 is used in this actual example and the power source substrate is 12 A, 60 V for the control•power source apparatus 2.

Dilute solution with color photograph developing waste fluid diluted to 5-fold was electrolytically treated. Developing solution waste fluid and fixing solution waste fluid were combined in a ratio of 5:9 for this developing waste fluid. Electrolytically treated water, which was electrolytically treated by being sent to electrolyzer 1 by a circulating pump 5 after the treated liquid was put in intermediate collecting chamber 4, flowed through circulating current path 51 and reached intermediate collecting chamber 4. Oxidation decomposition with good effects for difficult to decompose substances was the experimental objective; with continued circulating, purification was carried out by repeating the electrolytic treatment in the electrolytic path (reaction section) 13 of electrolyzer 1 and elimination by successive oxidation decomposition from comparatively easily decomposed substances.

Example I

Figures 3A, 3B:
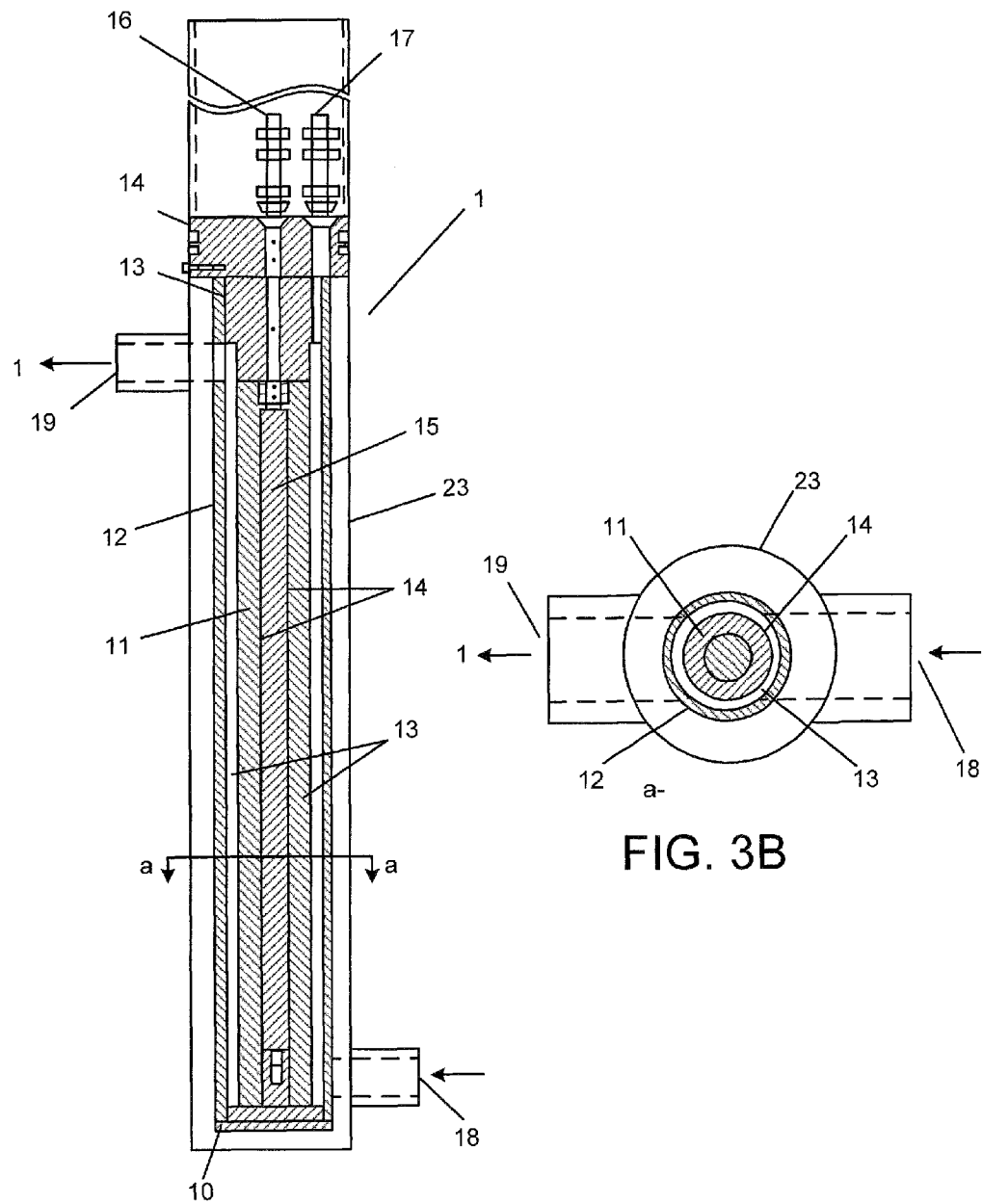
FIG. 3A is a lateral cross-sectional diagram and FIG. 3B a cut-away planar diagram that show an electrolyzer having a low melting point metal junction or a mercury filled section 6 inserted with a terminal main body 15 inside an anode of an electrolyzer that is constructed by a cylindrical anode 11 and cathode 12.

This example uses an electrolyzer 1 that is shown by a lateral cross-sectional view (FIG. 3A) and a cut-away cross-sectional view (FIG. 3B).

A long solid rod terminal main unit 15 was inserted into an open section of the cylindrical nickel ferrite anode 11, and heated and melted low melting point metal or mercury was used for filling when there was electrode production for the interval of the anode 11 and terminal main body 15. A spacing of 1.6 mm was provided at the outside of the cylindrical anode 11, a cylindrical titanium cathode 12 was set to create an electrolytic path in reaction zone 13. NaCl:NaBr was added in a mixing molar ratio of 80:20 for 5-fold dilute solution and the conductivity was adjusted to 25,000 μS/cm.

Having an electrode surface area of 2 dm² (dm²=square decimeter=100 cm²) for the electrolyzer 1, 5,000 cc of treatment liquid was put into intermediate collection chamber 4 and electrolysis was carried out while the treatment liquid being circulated by circulating pump 5 at a circulation rate of 500 cc per minute. The 5000 cc of treatment liquid was re-circulated once every 10 minutes and electrolytically treated, thus electrolytic treatment was done six times in 60 minutes. The effects of carrying out the test at current densities of 12, 18, and 24 A/dm² are shown in Table 1. The COD when the current density was raised to 24 A/dm² decreased to less than 100 mg/L, and can be discharged "as is" into the sewer. The maximum residual chlorine concentration even when less than one circulation per 5 minutes, in comparison with prior methods, was to the extent of 1,500 mg/L for the electrolysis time, and the generation of chlorine gas was also undesirable. The electrolytically treated water was extracted with hexane as per established methods and analyzed by ECD gas chromatography, but lower aliphatic halides such as chloroform and tetrachloroethylene were not tested for.

Table 1 Electrolytic Treatment of Developing Waste Fluid (Developing Waste Fluid Solution: Fixative Waste Fluid Solution 5:9)

TABLE 1

| | | | | | |
|---|---|---|---|---|---|
| Current | A | 12 | 24 | 36 | 48 |
| Electrical Conductivity | μS/cm | 25,500 | 25,200 | 25,000 | 25,300 |
| COD before Electrolytic Treatment | mg/L | 12,400 | 12,400 | 12,400 | 12,400 |
| COD | mg/L | | | | |
| Current Density | A/dm² | 6 | 12 | 18 | 24 |
| Electrolysis time (min.) | 0 | 12,400 | 12,400 | 12,400 | 12,400 |
| | 10 | 11,100 | 8,820 | 6,990 | 3,120 |
| | 20 | 10,200 | 6,750 | 4,350 | 1,135 |
| | 30 | 9,830 | 5,620 | 3,420 | 535 |
| | 40 | 9,560 | 4,855 | 2,890 | 260 |
| | 50 | 9,440 | 4,560 | 2,615 | 125 |
| | 60 | 9,370 | 4,430 | 2,460 | 95 |
| decomposition rate % | | 24 | 64 | 80 | 99 |

Example II

This example provides an oxidation decomposition example of industrial waste water by performing electrolysis while circulating washing waste water from a synthesis reaction apparatus of a factory that manufactures polyether.

This example was based on the system flow chart of FIG. 1, using a filter with a ceramic type filter medium that was added to a cylinder which was used in Example 3 of Japanese Patent Application H8-203814 "Filter Washing Refreshing Equipment" for filter 3, and electrolysis was carried out while 3,000 cc of treated liquid was put into the intermediate collection chamber 4 and was circulated by a circulating pump 3. The re-circulated amount was 300 cc every minute. The 3,000 cc treated liquid was re-circulated once every 10 minutes, thus electrolytic treatment was done such as being repeated six times in 60 minutes. Sodium chloride was added to the test wastewater and the electrical conductivity was adjusted to 25,000 μS/cm.

Figure 4:
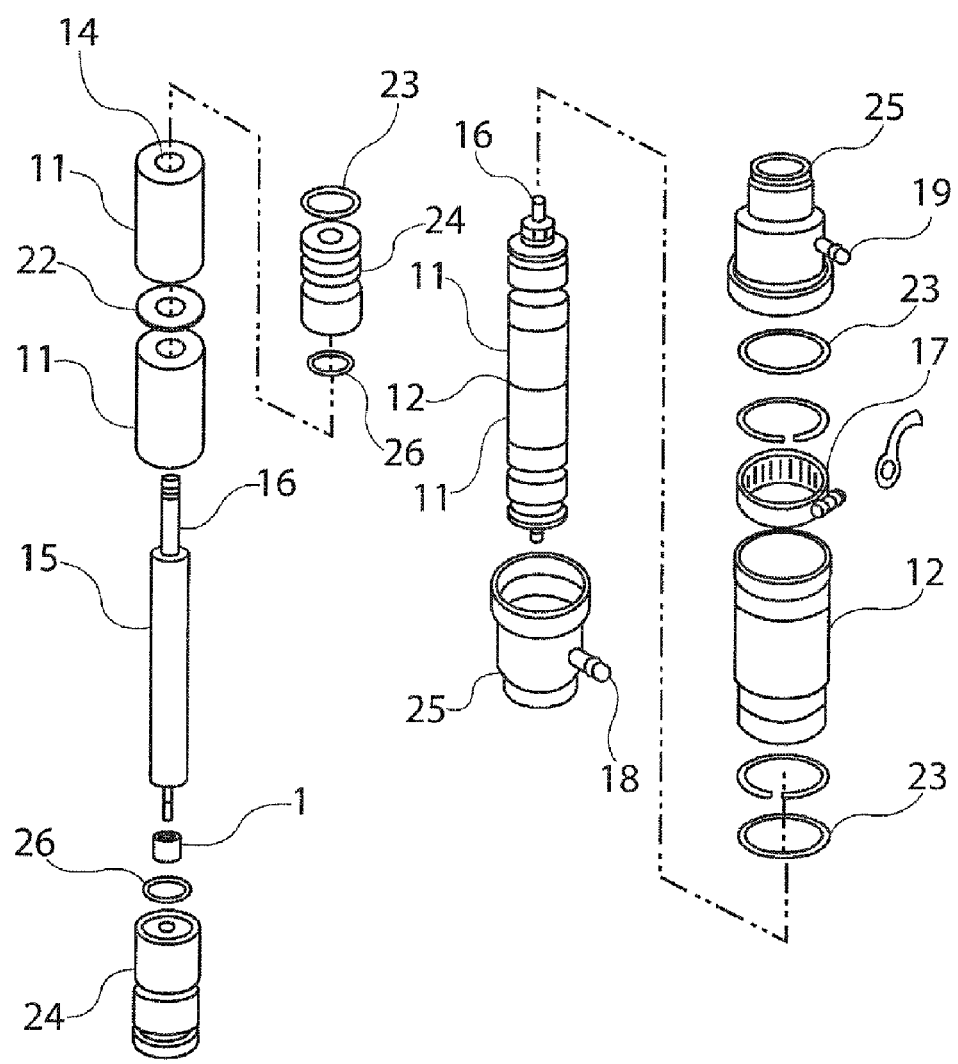
FIG. 4 is an exploded-view diagram detailing the elements of the electrolyzer of FIGS. 3A and 3B.

FIG. 4 is an exploded drawing of an electrolyzer 1 that is used in this example. The spacing of the cylindrical nickel ferrite anode 11 and the cylindrical titanium cathode 12 is 1.6 mm. The cylindrical nickel ferrite anode 11 uses one unit independently; two units are used by being connected when the electrode surface area is 0.44 dm², and are proportionate when the electrode surface area is 0.88 dm². The currents are respectively 12, 24 and 36 A. The current densities are 13.5, 27 and 41 A/dm² for 0.88 dm² with two units connected, and the current densities of one independent unit are 27, 54 and 82 A/dm². The effects when the test was carried out are shown in Table 2.

The decrease in the COD by only using and circulating through a filter 3 under conditions that prevented electrolytic treatment was undesirable. Further, the circulating current amount decreased because the filter resistance decreased when the circulation continued. Even for conditions like that, electrolysis treatment began, the filter pressure increased when continued and the circulating current amount returned to the initial conditions. The filtered substance that accumulated in the filter for this repeatedly received the oxidation action of the hypohalogenous acid and active oxygen that are generated in the circulating water, and the wide contact surface of the filter showed effective oxidation decomposition for electrolytically treated water. The residual chlorine concentration was not related to the electrode surface area, and was generated in a completely proportion ratio to the current value, but a large COD decrease effect was determined even though the residual chlorine concentration was not very high when the current density was high.

The COD resistance effect for the electrolytic treatment of industrial waste water (polyether manufacturing) with the manufacture of polyether is shown in Table 2 through the relationship of current density and COD.

The electrode surface is compared for when there are cases with 0.88 dm$^2$ and 0.44 dm$^2$.

TABLE 2

| Electrode Surface Area | dm$^2$ | 0.88 dm$^2$ | | | 0.44 dm$^2$ | | |
|---|---|---|---|---|---|---|---|
| Current | A | 12 | 24 | 32 | 12 | 24 | 32 |
| Electrical Conductivity | μS/cm | 25,800 | 25,500 | 25,600 | 25,200 | 25,000 | 25,300 |
| COD before Electrolytic Treatment | mg/L | 1,600 | 1,600 | 1,600 | 1,600 | 1,600 | 1,600 |
| COD mg/l | | | | | | | |
| Current Density | A/dm$^2$ | 13.5 | 27 | 41 | 27 | 54 | 82 |
| Electrolysis Time Minutes | 0 | 1,600 | 1,600 | 1,600 | 1,600 | 1,600 | 1,600 |
| | 10 | 1,580 | 1,490 | 1,390 | 1,560 | 1,470 | 1,380 |
| | 20 | 1,510 | 1,350 | 1,190 | 1,480 | 1,310 | 1,140 |
| | 30 | 1,290 | 1,020 | 790 | 1,210 | 960 | 680 |
| | 40 | 1,080 | 760 | 510 | 980 | 630 | 295 |
| | 50 | 990 | 660 | 450 | 820 | 440 | 95 |
| | 60 | 980 | 650 | 440 | 750 | 380 | 34 |
| Electrolytic Efficiency | | 39 | 59 | 72 | 53 | 76 | 98 |

Example III

The COD could be effectively reduced by oxidation treatment by the electrolysis of the present application for things like pond water and wastewater of golf courses and washing waste water of used agricultural chemical containers. However, since things like organic substances of the soil are mixed in with things like pond water and waste water, in the present actual example, tests were carried out by dissolving only agricultural chemicals that are commercially available in the water for confirming whether or not the COD decrease showed an elimination of agricultural chemicals.

The agricultural chemicals that were used in the present actual example were increased to the following.

(1) TPN Powder "Daconil Powder"
Component: TPN (Inorganic Chlorine Type, C Class) . . . 4%
When diluted 30-fold with pure water, the COD was 2,800 mg/L and dilute aqueous solutions of this concentration were used for the test.

[Compound 1] Component: TPN Chemical Structure

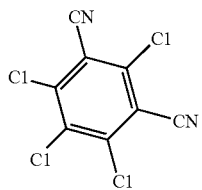

Tetrachloroisophthalonitril
(2) Triforin Emulsion "Saprol Emulsion"
Component: Triforin (Ergosterol Biosynthesized Composite, A Class) . . . 15%

When diluted 50-fold with pure water, the COD was 2,680 mg/L, and dilute aqueous solutions of this concentration were used for the test.

[Compound 2] Component: Triforin Chemical Structure

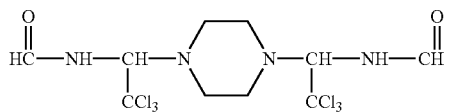

1,4-bis-(2,2,2-trichloro-1-formamide ether)-piperidine
(3) MEP Emulsion "Sumithion Emulsion"
Component: MEP (Organic Phosphorous Type, B Class) . . . 50%
When diluted 100-fold with pure water, the COD was 3,280 mg/L and dilute aqueous solutions of this concentration were used for the test.

[Compound 3] Component: MEP Chemical Structure

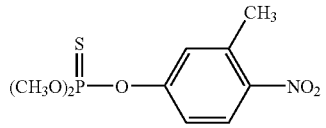

O,O-dimethyl-O-(3-methyl-4-nitrophenyl)thiophosphate

In the system flow diagram of FIG. 2, 3,000 cc of dilute aqueous agricultural chemical was put into an intermediate collection chamber 4 and electrolytically treated by an electrolyzer with a circulating pump 5. The oxidation decomposition action of hypohalogenous acid and active oxygen was executed during the re-circulation in the intermediate collection chamber 4 for the electrolytically treated water. Again circulated to the electrolyzer 1 through the re-circulating current path 51 and circulating pump 5, this was repeated until the water was purified by carrying out adequate oxidation decomposition. The filter, which had little particulate substance to filter, was not used in the present example.

The electrode surface area of the electrolyzer 1 in the present example was 0.44 dm$^2$, 5,000 cc of treatment liquid was put into the intermediate collection chamber 4, and electrolysis was carried out while being re-circulated by pump 5. The aqueous solution had an electrical conductivity of 200~300 μS/cm and a mixture of NaCl:NaBr of a mixed molar ratio of 60:40 was added and the electrical conductivity was adjusted to 30,000 μS/cm. The re-circulating amount was 500 cc every minute, thus the 5,000 cc of treated liquid was repeatedly electrolytically treated 6 times in 60 minutes.

The effects with the test carried out at a current density of 82 and 136 A/dm² are shown in Table 3.

Since the component content amount was different for the agricultural chemicals that were utilized in the present example, the COD level was adjusted by changing the dilution ratio. The decomposition rate obtained an effect of 90% or more during the electrolysis time of 60 minutes at electrolytic currents of 36 and 60 A. The relationship of current density and COD relative to the electrolysis time for the electrolytic treatment of three types of agricultural chemical aqueous solutions is shown in Table 3.

filter was used for the filter 3 (maximum 60 A, 60 V). The clear top layer part with the filtered substances sedimented and removed was used for the test. The SS of this clear top layer was 18, the pH was 7.6, electrical conductivity was 980, COD was 285 and the total nitrogen was T-N 18.

The electrical conductivity was adjusted to 30,000 µS/cm by adding only sodium chloride for the control and a mixture of NaCl:NaBr of a mixed molar ratio of 60:40 with the best effects obtained by the previously established test.

Dioxin was detected when there was Soxhlet extraction with toluene and analysis after collection with the Cuno filter

TABLE 3

| | Component | Daconil Powder TPN (organic chlorine type) 4% | | Saprol Emulsion Triforin 15% | | Sumithion Emulsion MEP (organic phosphorous type) 50% | |
|---|---|---|---|---|---|---|---|
| Number-Folds Dilution | -fold | 30 | | 50 | | 100 | |
| COD | mg/L | 2800 | | 2680 | | 3280 | |
| Current | A | 36 | 60 | 36 | 60 | 36 | 60 |
| Electrical Conductivity | µS/cm | 30,100 | 30,100 | 31,000 | 31,000 | 30,900 | 30,900 |
| COD before electrolytic treatment | mg/L | 2,800 | 2,800 | 2,680 | 2,680 | 3,280 | 3,280 |
| current density | A/dm² | 82 | 136 | 82 | 136 | 82 | 136 |
| COD Electrolysis Time in Minutes | mg/L | TPN 36 | TPN 60 | TFN 36 | TFN 60 | MEP 60 | MEP 60 |
| | 0 | 2,900 | 2,900 | 2,680 | 2,680 | 3,280 | 3,280 |
| | 10 | 1,650 | 1,230 | 1,530 | 1,070 | 2,150 | 1,410 |
| | 20 | 1,230 | 720 | 1,030 | 680 | 1,350 | 495 |
| | 30 | 1,080 | 480 | 755 | 430 | 865 | 225 |
| | 40 | 990 | 350 | 560 | 260 | 715 | 135 |
| | 50 | 975 | 255 | 524 | 155 | 694 | 95 |
| | 60 | 970 | 230 | 520 | 85 | 685 | 54 |
| decomposition rate % | | 66 | 92 | 80 | 96 | 79 | 98 |

Example IV

The ability to effectively decrease the COD by oxidation treatment by electrolysis of washing waste water of used agricultural chemical containers was determined in Example 3. Since the chemical structure of dioxin is close to these agricultural chemicals and the application of the present application for such purpose can be considered possible.

A subject of the present actual example is seeped wastewater that collects from seeping wastewater treatment containers of landfill soil of things like industrial waste, and are often harmful substances. The clear top layer with the filtered substances sedimented and removed was converted to 2,3,7,8-dibenzodioxin tetrachloride and contains 32 nanograms/L of dioxin. Further, after drying the filtered substances which were sedimented out, the dioxin was tested when Soxhlet extraction with toluene and analysis were performed.

A test apparatus that is shown in the system flow diagram of FIG. 1 was used in the present actual example and the control•power source apparatus 2 was made with the power source substrate of 12 A, 60 V within 5 units. A 5 µm Cuno adhering substances by the COD decomposition rate being 87% with the current density being 136 A/dm² since the electrical conductivity was adjusted to 30,000 µS/cm by adding only sodium chloride for electrolysis.

Dioxin could not be detected as the COD decomposition rate reached 94% at the current density being 136 A/dm² with the mixture being a NaCl:NaBr weight ratio of 60:40.

Moreover, dioxin could not be detected in Soxhlet extraction with toluene and analysis after the Cuno filter adhering substances were collected.

The seeping waste water of landfill soil contained 18 mg/L as the total nitrogen T-N of things like ammonious type nitrogen $NH_4$—N and nitric nitrogen $NO_3$—N, but could be decreased to 3 mg/L (decomposition rate of 83%) for %-N with electrolytic treatment of a current density of 136 A. As shown in FIG. 4, the COD and total nitrogen could be effectively decreased by carrying out electrolysis at a high current density.

TABLE 4

| | | NaCl (100) | | NaCl:NaBr (60:40) | |
|---|---|---|---|---|---|
| Current | A | 36 | 60 | 36 | 60 |
| Electrical Conductivity | µS/cm | 30,100 | 30,600 | 30,180 | 30,900 |
| Current Density | A/dm² | 82 | 136 | 82 | 136 |
| | mg/L | COD T-N | COD T-N | COD T-N | COD T-N |

TABLE 4-continued

| | | NaCl (100) | | | | NaCl:NaBr (60:40) | | | |
|---|---|---|---|---|---|---|---|---|---|
| electrolysis time | 0 | 285 | 18 | 285 | 18 | 285 | 18 | 285 | 18 |
| in minutes | 10 | 295 | 23 | 320 | 25 | 315 | 27 | 330 | 32 |
| | 20 | 310 | 17 | 187 | 14 | 255 | 15 | 168 | 18 |
| | 30 | 290 | 12 | 124 | 9 | 156 | 10 | 98 | 10 |
| | 40 | 185 | 8 | 83 | 6 | 112 | 8 | 54 | 6 |
| | 50 | 152 | 8 | 47 | 4 | 65 | 5 | 39 | 4 |
| | 60 | 95 | 7 | 36 | 4 | 42 | 4 | 18 | 3 |
| decomposition rate % | | 66 | 61 | 87 | 77 | 85 | 77 | 94 | 83 |

It is thus seen that the present invention provides numerous features and advantages as follows:

With the present invention, a powerful anode oxidation reaction can be brought about for waste fluid or waste water that is introduced into the electrolysis chamber by being done such that electrolysis can be performed at a high current density of 10 A/dm$^2$ or higher using a nickel ferrite electrode as the anode. Further, the decomposition rate can become even higher when there is circulating treatment since powerful oxidation action can be imparted by generating a high concentration of hypohalogenous acid and active oxygen.

With the present invention, a conductive bond can be formed for the junction of the nickel ferrite electrode 11 and terminal main body 15. With this electrode damage due to high temperature may be avoided. The full contact state without any spacing for the junction section of the nickel ferrite anode 11 and terminal unit 15 can be maintained by using a low melting point metal or mercury. Mercury absorbs the stretching and contracting due to the thermal expansion of the nickel ferrite electrode and terminal main body differing since mercury is a liquid. Further, a low temperature melting point metal is a solid at room temperature but becomes fluid in response to the increase in the current and voltage and flowability appears, and thus can absorb the contraction and expansion due to the heat of the anode 11 and the terminal unit 15. Further, a long solid rod terminal unit is inserted lengthwise such as making contact within the cylindrical electrode and a melted low melting point metal or mercury fills in that spacing, thus a broad electrical contact surface can be maintained. Therefore, the decomposition and purification of difficult to decompose substances becomes possible at high current density.

With the present invention, oxidation decomposition with good effects is possible for difficult to decompose substances which are difficult to oxidation decompose by prior art electrolytic treatments by carrying out electrolysis at a current density of 10~1000 A/dm$^2$, preferably at 20~300 A/dm$^2$.

With the present invention, the cylindrical nickel ferrite anode 11 is good even without respective establishment of a nickel ferrite anode for every electrode surface area since the anode surface area can be increased by the length-wise connection of a number of units by means of water resistant and corrosion resistant separators 22.

With the present invention, a wide range of difficult to decompose substances can be oxidation decomposed with good effects by adding sodium halide or potassium halide or a mixture of both when the electrical conductivity of the waste fluid or waste water is low. In particular, difficult to decompose substances can be decomposed even when neutral or weakly alkaline since hypohalogenous acid and active oxygen can be synthesized with good effects at a wide pH range when independent or by combining and using bromine ions as the halogen ions.

With the present invention, the waste fluid or waste water is introduced into the electrolytic path (reaction section) 13 of the electrolyzer 1, electrolytic treatment is repeatedly carried out and there can be elimination by successive oxidation decomposition from the comparatively easily decomposed substances to the difficult to decompose substances. In this case, oxidation decomposition is possible by effectively applying a high concentration of hypohalogenous acid and active oxygen that is generated by the electrolytic decomposition since there can be a suitable amount of retention time in the intermediate collection chamber 4 or filter 3.

The hypohalogenous acid and active oxygen of a high concentration in circulating treated water can be repeatedly reacted with the filtered substances that contain difficult to decompose substances in filter 3. Even difficult to decompose substances such as aromatic type compounds (benzene, chlorobenzene, chlorophenol), organic chlorine compounds (like trichloroethylene, tetrachloroethylene, tetrachloroethane), agricultural chemicals (such as DDT, PCP, parathion, TPN-.tetrachloroisophthalonitril, triforin, MEP.sumithion, diazinon), dioxin, PCB's and water soluble polymers (such as poly(vinyl alcohol, polyacrylonitrile, polyether), incinerator waste gas treatment water, landfill soil seeped waste water, and landfill soil washing waste water may be treated.

According to the present invention, repeated oxidation decomposition action can be brought about for waste fluid or wastewater by circulation. Further, the effect is great with the possibility of electrolytic treatment by diluting the concentration of the waste fluid or the waste water corresponding to the magnitude of the intermediate collection chamber 4 on that by being able to continuously treat by introduction of the same amount in waste fluid or waste water tank 6 since a portion can be discharged as treated water when the size of the intermediate collecting chamber 4 is suitable.

According to the present invention, the electrolytic efficiency can be increased since the filtered substances in the waste fluid or waste water are eliminated by establishing a filter 3 in the circulating current path 51 on the side toward the electrolytic chamber. The filtered substances that are collected in the filter repeatedly receive the oxidation decomposition action of the hypohalogenous acid and active oxygen that are generated in the circulating water. Even though things such as difficult to dissolve organic compounds, agricultural chemicals, dioxin and PCB's in the water adhere by being dissolved in the organic compounds or as particles, they collect on the filter as filtered substances and can be effectually oxidation decomposed by electrolytic treated water on the wide contact surface of the filter.

According to the present invention, a wide range of difficult to decompose substances such as aromatic compounds, organic chlorine compounds, agricultural chemicals (like DDT, PCP, parathion, TPN.tetrachloroisophthalonitril, triforin, MEP.sumithion, diazinon), dioxin, PCB's, water soluble polymers (like poly(vinyl alcohol), polyacrylonitrile, polyether) and nitrate ions that are contained in waste fluid or waste water can be easily oxidation decomposed with a simple apparatus.

The invention claimed is:

1. A waste fluid treatment method for converting difficult to decompose substances in waste fluids into harmless substances in which said waste fluids are mixed with an aqueous solution containing a sodium or a potassium halide, or a mixture of sodium and potassium halides, and are circulated through an electrolyzer unit having a ferrite anode and a cathode and subjected to electrolysis at a current density of 10~1000 A/dm$^2$ whereby to directly generate at the anode active oxygen in the form of a hydroxyl radical (OH.), and hypohalogenous acid for bringing about oxidation decomposition of said waste fluid into harmless substances, wherein the waste fluid has a conductivity of at least 25,000 μS/cm following mixture with said aqueous solution.

2. A waste fluid or waste water treatment method as claimed in claim 1, wherein the electrolyzer unit includes an anode formed of a low melting point metal.

3. A waste fluid or waste water treatment method as claimed in claim 1, wherein said electrolysis is carried out at a current density of 10~100 A/dm$^2$.

4. A waste fluid treatment method as claimed in claim 3, wherein said electrolysis are carried out at a current density of 20~300 A/dm$^2$.

5. A waste fluid treatment method as claimed in claim 1, wherein a number of electrolyzer units are connected lengthwise by means of a water resistant and corrosion resistant spacer and including the step of circulating said waste fluid through said electrolyzer units.

6. A waste fluid treatment method as claimed in claim 1, wherein said waste fluids are subjected to repeated electrolytic treatment by establishing a re-circulating flow of said fluids between an intermediate collection chamber or filter and said electrolyzer unit.

7. A waste fluid or waste water treatment method as claimed in claim 1, wherein the ferrite anode is formed of nickel ferrite, and a junction between the ferrite anode and the terminal main body is formed of a mercury filled section.

8. A waste fluid or waste water treatment method as claimed in claim 1, wherein said waste fluid comprises a material selected from the group consisting of an aromatic compound, an organic chlorine compound, an agricultural chemical, dioxin, a PCB, a water soluble polymer, a developing waste fluid, a factory waste water, an industrial waste water, and landfill soil seeped waste water.

9. A waste fluid or waste water treatment method as claimed in claim 8, wherein the aromatic compound is selected from the group consisting of benzene, chlorobenzene and chlorophenol.

10. A waste fluid or waste water treatment method as claimed in claim 8, wherein the organic chloride compound is selected from the group consisting of trichloroethylene, tetrachloroethylene and tetrachloroethane.

11. A waste fluid or waste water treatment method as claimed in claim 8, wherein the agricultural chemical is selected from the group consisting of DDT, PCP, parathion, TPN tetrachloroisophthalonitril, triforin, MEP sumithion and diazinon.

12. A waste fluid or waste water treatment method as claimed in claim 8, wherein the water soluble polymer is selected from the group consisting of polyvinyl alcohol, polyacrylonitrile and polyether.

\* \* \* \* \*